A
United States Patent [19]

Zavatteri et al.

[11] Patent Number: 4,983,666
[45] Date of Patent: Jan. 8, 1991

[54] AQUEOUS DISPERSIONS OF FLUORINATED POLYURETHANES AND THEIR USE FOR TEXTILE COATINGS

[75] Inventors: Ignazio Zavatteri, Cardano Al Campo; Tiziana Gambini, Castellanza, both of Italy

[73] Assignee: Ausimont S.p.A. & Larac S.p.A., Italy

[21] Appl. No.: 467,324

[22] Filed: Jan. 22, 1990

Related U.S. Application Data

[63] Continuation of Ser. No. 137,358, Dec. 22, 1987, abandoned.

[30] Foreign Application Priority Data

Dec. 30, 1986 [IT] Italy ............................. 22883 A/86

[51] Int. Cl.$^5$ ............................................. C04J 3/05
[52] U.S. Cl. .................................. 524/539; 524/500; 524/591; 524/805; 524/839; 524/840; 524/832
[58] Field of Search ............... 524/591, 439, 846, 805, 524/832, 500, 539

[56] References Cited

U.S. PATENT DOCUMENTS

| | | | |
|---|---|---|---|
| 3,242,218 | 3/1966 | Miller .................................. | 568/683 |
| 3,250,808 | 5/1966 | Moore, Jr. et al. ................ | 562/586 |
| 3,665,041 | 5/1972 | Sianesi et al. ....................... | 568/413 |
| 3,810,874 | 5/1974 | Mitsch et al. ...................... | 564/157 |
| 3,872,058 | 3/1975 | Gresham . | |
| 3,972,856 | 8/1976 | Mitsch et al. ....................... | 528/70 |
| 3,988,278 | 10/1976 | Bartizal . | |
| 4,046,944 | 9/1977 | Mueller et al. ..................... | 428/262 |
| 4,054,592 | 10/1977 | Dear et al. .......................... | 560/25 |
| 4,172,191 | 10/1979 | Nachtkamp et al. ................ | 528/61 |
| 4,203,883 | 5/1980 | Hangauer, Jr. . | |
| 4,325,857 | 4/1982 | Champaneria et al. ............. | 523/412 |
| 4,408,008 | 10/1983 | Markusch ........................... | 524/591 |
| 4,496,675 | 1/1985 | Hille et al. .......................... | 524/77 |
| 4,497,932 | 2/1985 | Trovati ................................ | 524/591 |
| 4,523,039 | 6/1985 | Lagow et al. ....................... | 568/683 |
| 4,554,308 | 10/1985 | Russiello ............................. | 524/591 |
| 4,616,061 | 10/1986 | Henning et al. .................... | 524/591 |
| 4,647,413 | 3/1987 | Savu .................................... | 562/850 |
| 4,670,100 | 6/1987 | Henning et al. .................... | 162/135 |
| 4,675,452 | 6/1987 | Lagow et al. ....................... | 568/601 |
| 4,701,480 | 10/1987 | Markusch et al. .................. | 523/340 |
| 4,711,926 | 12/1987 | Kojima ................................ | 524/512 |
| 4,720,527 | 1/1988 | Caporiccio et al. ................ | 525/403 |
| 4,721,795 | 1/1988 | Caporiccio et al. ................ | 549/445 |
| 4,757,145 | 7/1988 | Caporiccio et al. ................ | 548/152 |
| 4,764,553 | 8/1988 | Mosbach et al. ................... | 524/591 |
| 4,808,472 | 2/1989 | Caporiccio et al. ................ | 428/421 |

FOREIGN PATENT DOCUMENTS

| | | |
|---|---|---|
| 0148482 | 12/1984 | European Pat. Off. . |
| 0151877 | 12/1984 | European Pat. Off. . |
| 0156155 | 2/1985 | European Pat. Off. . |
| 0165649 | 2/1985 | European Pat. Off. . |
| 0165650 | 2/1985 | European Pat. Off. . |

*Primary Examiner*—Morton Foelak
*Assistant Examiner*—Dennis R. Daley
*Attorney, Agent, or Firm*—Morgan & Finnegan

[57] ABSTRACT

Aqueous dispersions of fluorinated polyurethanes obtained by the reaction of an organic diisocyanate with a mixture of diols containing ionizable groups and macroglycols comprising polyols and at least 1% by weight of one or more hydroxy- and/or carboxy-capped fluoropolyethers. Said fluorinated polyurethanes are salified, to transform the ionizable groups into hydrophilic cations and/or anions, and are then dispersed in water to be used in textile coatings.

13 Claims, No Drawings

AQUEOUS DISPERSIONS OF FLUORINATED POLYURETHANES AND THEIR USE FOR TEXTILE COATINGS

This application is a Continuation of application Ser. No. 137,358, filed Dec. 22, 1987, now abandoned.

DESCRIPTION OF THE INVENTION

1. Field of the Invention

The present invention relates to aqueous dispersions of fluorinated polyurethanes and to their use for textile coatings.

More particularly, the present invention relates to aqueous dispersions of fluorinated polyurethanes, and to their use in the preparation of textile products endowed with both high impermeability to liquid water and high breathability to water vapour.

2. Background of the Invention

It is well known that the textile industry has been concerned for some time to provide textile products endowed with contemporaneously high impermeability and breathability, for uses in the sporting field or in working clothes, or, more generally, in clothes for open-air uses, as reported in the Journal of Coated Fabrics, 1985, 15 (7), 40–66, and in Melliand Textilberichte, 1986, 67 (4), 277–287 and 67 (11), 824–829. For that purpose, as these references mention, different methods are used which can be divided into six main techniques.

A first technique consists in impregnating textile substrates with water-repellent products, such as waxes, silicones, fluorinated hydrocarbons, aluminum- and chrome-salts, and so forth. In this way articles are obtained which are endowed with a good breathing level, but which show a low impermeability, and a poor water-repellency upon washing and wear.

A second technique comprises the coating of thick (generally thicker than 60 g/m$^2$) and compact layers of polyvinyl chloride, chlorinated rubbers, polyurethanes (PU), and so forth, on textiles.

The so-obtained articles show a high impermeability, but nearly zero breathing characteristics.

The reduction in thickness of the deposited layer, sometimes down to values of approximately 30 g/m$^2$, makes it possible to obtain adequate values of breathing characteristics but severely impairs the impermeability.

As another alternative, microperforations are provided on heavily-coated materials, e.g., by means of electrical discharges between high-voltage electrodes, with a minor decrease in impermeability but still with insufficient breathing characteristics.

According to a third technique, textile fabrics are coupled with films that are impermeable but endowed with breathing characteristics, such as those of polytetrafluoroethylene (PTFE) or polyester (PES).

In case of PTFE, membranes or films previously subjected to a controlled draught, so as to provide pores of a diameter of approximately 0.2 micrometers, are used. Such membranes are permeable to water vapor but not to liquid water.

In case of PES, the breathing characteristics are secured by the formation of labile hydrogen bonds between the molecules of the water vapor and the ester functions of the fibers of the membrane from which occurs the transportation of water vapor between adjacent ester groups.

These articles are very satisfactory as regards the applicative performance, but they involve the use of expensive materials and/or of a coupling technique, less diffused and more complex than a spreading or coating technique.

A fourth technique consists in using fabrics constituted by microfibers (having a count lower than 0.2 dtex), which are inherently hydrophobic in the absence of any treatments.

The corresponding articles have good breathing characteristics, but show considerable decrease in impermeability due to washings, abrasions, and soiling with oil, or other materials, and consequently suffer serious use limitations in the field of working clothes.

A fifth technique relates to particular coatings of two different types. One type uses polyethoxylated polyurethanes (PU's) suitable for providing the water vapor transportation thanks to adsorptions and desorptions following one another, according to the mechanism based on the presence of labile hydrogen bonds, as above mentioned.

The other type uses solutions in volatile solvents of resins or monomers polymerizable by irradiation (Chemical Week 1986, 138 (25) 22–23) and other materials suitable to develop gaseous products, e.g., isocyanic prepolymers, which develop $CO_2$ in the presence of moisture.

But the thus-obtained textile articles generally require further treatments, such as the application of silicones, or other surface-finishing treatments.

A sixth technique provides coatings of the sponge type such as by means of the coagulation of aqueous baths of PU's dissolved in dimethylformamide, previously coated on a support fabric. This requires relatively complex facilities and expensive treatments of the effluent streams. Furthermore, to achieve suitable levels of water-repellency, specific auxiliary agents are necessary, e.g., perfluorocompounds, to be introduced into the coating formulation, or subsequently.

It has now, surprisingly, been discovered that stable aqueous dispersions of fluorinated polyurethanes, to be mainly used for preparing textile articles endowed simultaneously with high impermeability and good breathability, are those obtained by starting from an organic diisocyanate and a mixture comprising diols containing ionizable groups and macroglycols based on polyols and hydroxy- and/or carboxy-capped fluoropolyethers.

DETAILED DESCRIPTION OF THE INVENTION

The principal object of the present invention is hence the provision of stable aqueous dispersions of fluorinated polyurethanes containing in their macromolecule hydrophilic ionic groups, both of anionic and cationic character, which may be obtained according to the following steps:

(a) preparation of a fluorinated polyisocyanate, by reaction between an organic diisocyanate and a mixture comprising diols containing ionizable groups and macroglycols comprising polyols and at least 1% by weight of one or more hydroxy- and/or carboxy-capped fluoropolyethers;

(b) salification of the thus-obtained fluorinated polyisocyanate, to convert the ionizable groups into hydrophilic cations or anions; and (c) dispersion and chain extension of the salified fluorinated polyisocyanate in water.

According to the present invention, the fluorinated polyisocyanate is obtained from an organic diisocyanate and a mixture on the basis of diols and macroglycols, in such amounts that the molar ratio of the isocyanate groups to the total sum of the hydroxy groups is within the range of from 1.2 to 2, and is preferably equal to 1.5.

The hydroxy- and/or carboxy-capped fluoropolyethers are used in amounts larger than 1% by weight, computed relative to the macroglycols, but amounts within the range of from 3 to 20% by weight are most commonly used.

The formation of the fluorinated polyisocyanate may be carried out in the presence or in the absence of organic solvents.

In case the reaction is carried out in the presence of solvents, these may be selected from the group consisting of cellosolve acetate, acetone, tetrahydrofuran, methyl ethyl ketone, and so forth.

The reaction temperatures are nearly always lower than 100° C., and are preferably within the range of from 50° to 90° C.

The reactions may furthermore be accomplished in the presence of catalysts known in the art, such as the metal-organic compounds, or tertiary amines; examples of such catalysts are: dibutyltin dilaurate, tin octoate, cobalt naphthenate, vanadium acetylacetonate, dimethyltin diethylhexanoate and their mixtures, triethylenediamine, tetramethylguanidine, dimethylcyclohexylamine, and so forth. The preferred catalysts are triethylenediamine and dibutyltin dilaurate. The catalysts are used in catalytic concentrations, and generally at concentrations not higher than 0.1% by weight.

The organic diisocyanates which may be used in the preparation of the aqueous dispersions of the present invention have the general formula $R(NCO)_2$, wherein R represents an alkylene, cycloalkylene, alkylene-cycloalkylene or arylene radical containing from 1 to 20 carbon atoms.

Examples of such diisocyanates are: 2,4-toluenediisocyanate either alone or in admixture with 2,6-toluenediisocyanate isomer, 4,4'-diphenyl-methanediisocyanate, 4,4'-dicyclohexyl-methanediisocyanate, 1-isocyanato-3-isocyanato-methyl-3,5,5-trimethylcyclohexane (or isophorone diisocyanate), 2,4,4-trimethylhexamethylene-diisocyanate, in mixture with 2,4,4-trimethylhexamethylene-diisocyanate isomer, ethylidene-di-isocyanate, butylene-diisocyanate, hexamethylene-diisocyanate, cyclohexylene-1,4-diisocyanate, cyclohexylene-1,2-diisocyanate, xylylene-diisocyanate, dichloro-hexamethylene-diisocyanate, dicyclohexyl-4,4'-diisocyanate, 1-methyl-2,4-diisocyanato-cyclohexane, 1-methyl-2,6-diisocyanato-cyclohexane, and so forth. Among these, the aliphatic or cycloaliphatic diisocyanates are preferred when high resistance to U.V. light and to hydrolytic degradation are required.

As the ionizable diols, those able to endow the polyurethanic macromolecule with a preferentially anionic charge are preferred, in as much as in such case end products are obtained which are compatible with auxiliary products, pigments, dyes, and aqueous dispersions of a diverse nature (e.g., acrylic, vinylic, butadiene-acrylonitrilic dispersions, etc.), almost totally of an anionic nature.

As the ionizable diols, those diols may be used which contain a free carboxyl group, preferably if bonded to the same carbon atom which bears the two hydroxyl groups, e.g., dimethylolacetic acid, dimethylolpropionic acid, dimethylolbutyric acid, and so forth.

Furthermore, compounds containing at least two hydroxyl groups and a carboxyl group not bound to the same carbon atom may also be used, such as, e.g., the products of semiesterification of triols with aliphatic dicarboxylic anhydrides.

However, according to the present invention no bars exist against the use of dispersions having a cationic character, by using as ionizable diols the tertiary alkyl-dialkanolamines already known in the art, such as, e.g., methyldiethanolamine, butyldiethanolamine, methyl-diisopropanolamine, and so forth.

The macroglycols which may be used to prepare the aqueous dispersions of the present invention comprise polyols and hydroxy- and/or carboxy-capped fluoropolyethers.

As polyols, those having a molecular weight within the range of from 500 to 5000, preferably of from 800 to 3000, and selected from the class consisting of saturated polyesters, polyethers, polyester-urethanes, polyether-urethanes, polyurethaneamides, may be used.

Examples of polyesters are the products of polycondensation of preferably aliphatic anhydrides or dicarboxylic acids having from 4 to 9 carbon atoms, such as succinic, adipic, sebacic, azelaic, etc., anhydrides or acids with ($C_2$–$C_8$)-aliphatic diols either alone or mixed with one another, such as ethylene glycol, propylene glycol, 1,3- and 1,4-butanediol, 1,6-hexanediol, etc., or the products of polycondensation of -caprolactone on diolic "starters".

Examples of polyester-urethanes are the products of polyaddition of the above-mentioned polyesters with organic diisocyanates in molar deficiency.

Examples of polyethers are the various types of polyethylene glycol, polypropylene glycol, and, preferably, the products of polymerization of tetrahydrofuran.

The above-mentioned polyols may be used together with small amounts of low molecular weight polyols, preferably of the trifunctional type, such as trimethylolpropane, glycerol, 1,2,6-hexanetriol, and so forth.

The hydroxy- and/or carboxy-capped fluoropolyethers have a molecular weight within the range of from 500 to 7,000, preferably of from 1,000 to 2,500, and are selected from the class of those having the formulae:

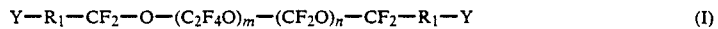  (I)

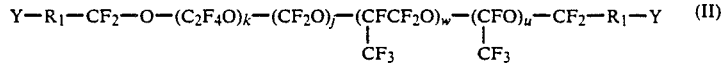  (II)

  (III)

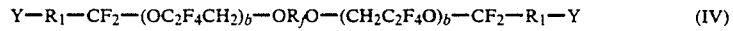  (IV)

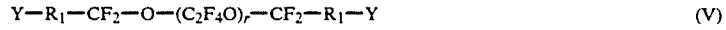  (V)

$$Y-R_1-CF_2-(OCF_2CF)_c-OR_f-O-(CFCF_2O)_c-CF_2-R_1-Y \quad (VI)$$
$$\qquad\qquad\qquad\; |\qquad\qquad\qquad\;\; |$$
$$\qquad\qquad\qquad CF_3\qquad\qquad\qquad CF_3$$

$$Y-R_1-CF_2-O-(CF_2CFO)_v-(CFXO)_z-CF_2-R_1-Y \quad (VII)$$
$$\qquad\qquad\qquad\qquad |$$
$$\qquad\qquad\qquad\;\; CF_3$$

$$Y-R_1-CF_2-O-(CF_2CFO)_a-CF_2-R_1-Y \quad (VIII)$$
$$\qquad\qquad\qquad\qquad |$$
$$\qquad\qquad\qquad\;\; CF_3$$

$$Y-R_1-CF_2-(OCF_2CF_2CH_2)_g-O-CF_2-R_1-Y \quad (IX)$$

wherein:

$R_1$ is selected from $-(CH_2)_x-$, $-(CH_2O)_yCH_2-$, $-(CH_2)_xOCH_2-$, wherein x and y are integers within the range of from 1 to 4;

m and n are integers, wherein the m/n ratio is within the range of from 0.2 to 2, preferably within the range of from 0.5 to 1.2;

$R_f$ is a perfluoroalkylene radical;

X is —F or —$CF_3$;

Y represents an —OH and/or a —COOH group; and k, j, w, u, d, b, r, c, v, z, a, g are integers which make it possible for the above-mentioned molecular weights to be obtained.

The fluoropolyethers having the above formulae of form (I) to (IX) may be obtained according to processes such as disclosed in U.S. Pat. Nos. 3,242,218; 3,250,808; 3,665,041; 3,810,874 and 4,523,039; and in European patent applications Nos. 148,482; 151,877; 165,649; and 165,650.

Preferred hydroxy- and/or carboxy-capped fluoropolyethers are α, ω-bis-(hydroxymethyl)-polyoxyperfluoroalkylene and α, ω-(polyoxyperfluoroalkane)-dioic acid having an average molecular weight of 2,000, as produced and marketed by Montefluos S.p.A., under the trade marks Fomblin Z-DOL 2000 and Fomblin Z-DIAC 2000 respectively.

The salification of the fluorinated polyisocyanate, whether of anionic or cationic type, is preferably carried out in the molten state and may be carried out by simply adding the salifying agent as such, or dissolved in water and/or solvents at temperatures of approximately 90° C.; should the molten polyisocyanate have too high a viscosity at such temperatures, diluting it will be suitable, before the salification, with preferably water-miscible solvents having boiling points lower than that of water, so as to make it possible for them to be distilled off.

The amount of solvent normally necessary does not exceed one fifth of the polyisocyanate weight. Examples of suitable solvents are: acetone, methyl-ethylketone, tetrahydrofuran.

For salifying the polyisocyanate of anionic type, salifying agents selected from the class of the inorganic bases, such as sodium or ammonium hydroxide, and the tertiary amines or alkanolamines, such as triethylamine, dimethylethanolamine, methyl-diethanolamine, and so forth, are preferably used.

For salifying the cationic-type polyisocyanates, organic and/or inorganic acids are used, such as hydrochloric, phosphoric, formic, lactic, acetic acid, and so forth.

After the salification is completed, the fluorinated polyisocyanate may be dispersed in water in all dilution ratios. Therefore, the salified fluorinated polyisocyanate is dispersed in water so to have a solids content, variable according to the ionic groups, higher than 20% by weight, and preferably within the range of from 30 to 50% by weight, after the possibly previously-used organic solvent is distilled off.

According to an alternative route, the stable aqueous dispersions of fluorinated polyurethanes containing in their macromolecule hydrophilic ionic groups, whether of anionic or cationic nature, may be obtained by means of the following steps:

(i) preparation of a fluorinated polyisocyanic prepolymer by reacting an organic diisocyanate with a mixture comprising diols containing ionizable groups and macroglycols comprising polyols and at least 1% by weight of one or more hydroxy- and/or carboxy-capped fluoropolyethers;

(ii) conversion of the fluorinated polyisocyanic prepolymer into an oligo-urethane having unsaturated vinyl end groups, by reacting a compound containing hydroxyls reactive with the isocyanate groups, selected from hydroxy-alkyl-acrylates or -methacrylates having the formula:

$$CH_2=C-COOW \quad (X)$$
$$\qquad\; |$$
$$\qquad R_2$$

wherein $R_2$ is hydrogen or a ($C_1$-$C_4$)-alkyl radical and W is a hydroxyalkyl radical;

(iii) salification of the so-obtained oligo-urethane to convert the ionizable groups into hydrophilic cations or anions;

(iv) dispersion of the salified oligo-urethane in water; and (v) polymerization of the unsaturated end groups of said oligo-urethane dispersed in water.

The stable aqueous dispersions of fluorinated polyurethanes containing in their macromolecule hydrophilic ionic groups are obtained, according to the present alternative method, according to procedures analogous to those already disclosed.

In particular, the formation of the fluorinated polyisocyanic prepolymer takes place by the reaction between an organic diisocyanate and a mixture constituted by diols and macroglycols in such amounts that the molar ratio between the isocyanate groups and the total number of the hydroxy groups is within the range of from 1.2 to 2, and is preferably equal to 1.5.

The fluorinated polyisocyanic prepolymer is then converted into an oligo-urethane containing ethylenically unsaturated end groups, by reaction with the hydroxy-alkyl acrylates or methacrylates having the formula (X) above at temperatures lower than 150° C., and preferably within the range of from 60° to 120° C.

The amount of these acrylates or methacrylates used is determined by the content of free isocyanate groups still existing in the polyisocyanic prepolymer; such amounts, as to have NCO-eq/OH-eq ratios within the range of from 0.5 to 1.1, and preferably 1, are the most commonly used.

Preferred hydroxyl-alkyl acrylates or -methacrylates of formula (X) are those wherein R is hydrogen, or a methyl radical, and W is a 2-hydroxyethyl, 2-hydroxypropyl, 3-hydroxypropyl, or 4-hydroxybutyl radical.

The thus-obtained oligo-urethane is salified and dispersed in water according to the procedures disclosed above and is then polymerized by per se known techniques.

The polymerization is carried out by using free-radical generators, e.g., of the type of organic peroxides or hydroperoxides, or of the type of sodium, potassium, ammonium persulphates, etc., either alone or together with such reducing agents as sodium metabisulphite, sodium formaldehyde sulphoxylate, and so forth.

The polymerization temperature may be within the range from 10° to 100° C., according to the free radical initiator used.

The aqueous dispersions of the present invention are stable over a long time even in the total absence of surfactants and/or protective colloids. Such a stability is a function of the amount of contained ionic centers, which may be expressed as milliequivalents per 100 g of polymer, considered as the dry substance. Said values may range from 10 to 60 meq/100 g of dry substance, and preferably from 20 to 40 meq/100 g of dry substance.

Because of the ionic character of the polymer, such dispersions are sensitive to electrolytes.

Stabilization thereof may be obtained by means of surfactants and/or protective colloids of non-ionic type, such as ethoxylated derivatives of higher fatty alcohols, or alkylphenols. The use of ionic surfactants must obviously take into account the cationic or anionic nature of the dispersions in question.

The aqueous dispersions of fluorinated polyurethanes of the present invention are preferably used in the preparation or textile articles endowed with contemporaneously high impermeability and breathability.

According to these preparation techniques, either woven or non-woven textile articles, from natural, artificial or synthetic fibers, are treated with such dispersions by coating them on the textile article at dry-deposit levels higher than, or equal to, 20 g/m$^2$, and preferably within the range of from 20 to 40 g/m$^2$.

Any fibers, or fiber blends, may be used for preparing the textile articles endowed with contemporaneously high impermeability and breathability; examples of suitable natural fibers are wool, silk, cotton, flax, etc.; suitable artificial fibers are cellulosic fibers, and suitable synthetic fibers are acrylic, polyester, polyamidic, and so forth, fibers.

The aqueous dispersions of fluorinated polyurethanes used for the preparation of textile articles endowed with contemporaneously high impermeability and breathability have a solids content within the range of from 20% to 60% by weight, and preferably of from 30 to 50% by weight. These dispersions may be used as such, or after the addition to them of suitable thickeners such as, e.g., cellulose ethers, polymeric derivatives basded on acrylic acids and/or esters, etc.

The coating process may be performed by the usual techniques, and in particular, by a floating knife or by a knife over roll, plate or blanket.

The degree of penetration of the coated matter into the support fabric may be controlled by means of the viscosity of the paste, or in other ways, according to the per se known art, so as to secure the anchoring of the coating, and, at the same time, providing a proper surface covering.

The drying may be performed by any system which makes it possible to remove water at a temperature not higher than 100° C.; if desired, adopting expedients that accelerate water release, such as ventilation, pressure reduction, and so forth.

The usual hot-air ovens may be used, with residence times of the order of some minutes when the air temperature is approximately 100° C.

The thus-treated textile article may be subjected to a further thermal treatment, generally within the range of from 100° to 150° C., over short times, to improve the fastness of the polyurethanic deposit.

By using the aqueous dispersion of the present invention, such drawbacks of the prior art as the possible treatments both before and after the application of the dispersion, comprising silicone application, the need for use of impregnating or coupling techniques more complex than the coating or of special textile articles, and so forth, may be avoided.

Furthermore, one may contemporaneously achieve high impermeability and breathing characteristics with low levels of polyurethanic deposit, and improved characteristics of fastness of the same deposit to both wet- and dry-washing, and, in general, to wear.

The textile articles, both woven and non-woven, after the treatment with the aqueous dispersions of fluorinated polyurethanes of the present invention, have a permeability to water vapor within the range of from 900 to 1600 ng/sm$^2$ Pa, as measured according to ASTM E 96, and an impermeability to water higher than 24 hours, under the 2-meter water head, as measured according to UNI 5122 Standard.

For the purpose of still better understanding and of practically embodying the present invention, some illustrative but non-limitative examples are given below.

EXAMPLE 1

In the preparation of a first fluorinated polyurethane, the two operating steps were used. In the first step, an NCO-capped prepolymer was prepared.

For that purpose, 120 g of $\alpha$, $\omega$-bis(hydroxymethyl)-polyoxyperfluoroalkylene having a molecular weight of 2,000, produced and marketed by Montefluos S.p.A. under the trade mark Fomblin Z-DOL 2000; 19.7 g of toluenediisocyanate, and 60 g of cellosolve acetate were charged, with good stirring, to a reactor filled with nitrogen gas, connected with an expansion vessel for nitrogen, kept immersed in a temperature-controlled bath, and equipped with stirrer, thermometer, and refluxing condenser.

After heating to 40° C., always with stirring, 0.02 g of triethylenediamine (diazabicyclooctane, DABCO) was added, the temperature was then increased to 80° C. and was maintained at that value for approximately 2 hours, with the exothermicity of the reaction being monitored.

A product was obtained with a content of 70% of dry matter, with a content of isocyanic groups of 2.4% by weight, and a molecular weight of approximately 2,400.

In the second operative step, the extension of the macromolecular chain and the transfer of the product into the aqueous phase were carried out.

For those purposes, to a reactor analogous to the previous one, 198.89 g of polyoxytetramethylene glycol with an average molecular weight 1,000 (Terathane 1000, a product of E. I. du Pont de Nemours); 12.33 g of dimethylopropionic acid; 22.86 g of the adduct obtained from the previous operative step, and 64.83 g of hexamethylenediisocyanate were charged, with the temperature being maintained first at 60° C. for 30 minutes, and then at 75° C. for about 1.5 hours.

A product with 3.1% by weight of free isocyanate groups, referred to the dry substance, was obtained.

Then, 87 g of anhydrous acetone, a solution of 8.18 g of dimethylethanolamine in 165 g of deionized water, and soon after a further 445 g of deionized water were added.

Finally, acetone was distilled off. A milky, low-viscosity product was obtained, which contained 31% of dry substance and 4.5% of perfluoro-compound referred to the dry substance.

EXAMPLE 2

The process was carried out as disclosed in Example 1 until the product containing 3.1% by weight, relative to the dry weight, of free isocyanate groups, was obtained. Then, 87 g was added of anhydrous acetone, with the temperature being increased to 60° C., then 5.28 g was added of 2-hydroxypropyl acrylate, and with the atmosphere being changed from nitrogen to dry air. The reaction mass was maintained at 60° C. until a content of 2.3% by weight of free isocyanate groups, relative to the dry matter, was attained. With the reaction mass being sufficiently stirred, to it a solution of 8.18 g of dimethylethanolamine in 165 g of deionized water, and soon after 445 g of deionized water, were added. After the mass was dispersed in water, acetone was distilled off. When distillation was ended, the nitrogen atmosphere was restored, and at a temperature of 50° C., 1.19 g of tert-butyl-hydroperoxide in aqueous solution at 12% by weight, diluted with 40 g of H$_2$O, and 0.59 g of sodium formaldehyde sulphoxylate dissolved in 40 g of H$_2$O, were added separately within 2 hours.

A milky, low-viscosity product was thus obtained, which contained 31% of dry substance and 4.5% of perfluoro-compound referred to the dry substance.

EXAMPLE 3

The process was carried out in one operative step only. To a reactor, analogous to that of Example 1, 227 g of polyoxytetramethylene glycol of the preceding example; 13.7 g of α, ω-(polyoxyperfluoroalkane)-dioic acid having an average molecular weight of 2,000, manufactured and marketed by Montefluos S.p.A. under the trade mark Fomblin Z-DIAC 2000; 14.47 g of dimethylolpropionic acid; and 77.57 g of hexamethylenediisocyanate, were charged with stirring.

The reaction mass was heated to 60° C. and maintained at that temperature for 30 minutes; it was then further heated to 75° C. and was maintained at this temperature for 1.5 hours, whereupon a decrease in the content of free isocyanate groups to 3.25% by weight, relative to the dry matter, was detected.

After cooling to 60° C., 100 g of anhydrous acetone was added, then, after increasing the rate of stirring, an aqueous solution of dimethyl-ethanolamine (10.88 g in 218 g of deionized water) was added within a time of approximately 5 minutes, and soon after, a further 465 g of deionized water were added.

Finally, acetone was distilled off. A milky, low-viscosity product with a content of 30% of dry substance and a level of 4% of perfluoro-compound relative to the dry weight was obtained.

EXAMPLE 4

The process is carried out as described in Example 3, until the product containing 3.25% by weight, relative to the dry weight, of free isocyanate groups is obtained.

After cooling to 60° C., 100 g of anhydrous acetone and 628 g of 2-hydroxypropyl acrylate were added, and the atmosphere was changed from nitrogen to dry air. The temperature was maintained at 60° C. until a content of 2.2% by weight of free isocyanate groups, relative to the dry matter, was attained in the reaction mass. With an efficient stirring, to the reaction mass an aqueous solution of dimethylethanolamine (10.88 g in 218 g of deionized water) was added, during a time of approximately 5 minutes, and soon after a further 465 g of deionized water were added. Acetone was then distilled off.

When distillation was complete, after the nitrogen atmosphere was restored the temperature was increased to 50° C., and during 2 hours 1.95 g of tert-butyl-hydroperoxide in an aqueous solution at 12% by weight, diluted in 30 g of water, and 0.97 g of sodium formaldehyde sulphoxylate dissolved in 40 g of H$_2$O were added contemporaneously, and separately.

A milky, low-viscosity product was obtained, which contained 30% of dry substance and a level of 4% of perfluoro-compound referred to the dry substance.

EXAMPLE 5

An aqueous dispersion of non-fluorinated polyurethanes was prepared for comparative purposes, by operating with the same procedures as in Example 4, but with the difference that α, ω-(polyoxyperfluoroalkane)-dioic acid was not used; it was replaced by 6.8 g of polyoxytetramethylene glycol.

A milky, low viscosity product was obtained which contained 30.5% of dry matter.

EXAMPLE 6

To 100 parts by weight of a dispersion obtained according to Example 1, 5 parts was added of an acrylic thickening agent containing 15% by weight of dry matter.

To the resulting mixture, an aqueous solution of NH$_4$OH at 32% by weight of dry matter was added, until a viscosity of 15,000 mPa sec (Brookfield RVT at 20° C. and 20 rpm, spindle 6) was obtained.

The so-obtained coating paste was applied to a nylon fabric, whose characteristics are reported in Table 1, by a knife over plate. 5 samples with different deposited amounts were prepared.

The coated specimens were then dried in a hot-air oven at 100° C. for 7 minutes, and were then treated at 150° C. for 2 minutes inside the same equipment.

No silicones were applied.

The finished samples were analyzed for the deposited amount (as determined from the difference in weight between the coated fabric and the virgin fabric). These were then subjected to a spray test (UNI 5120) and to tests for impermeability (UNI 5122) and permeability to water vapor (ASTM E 96).

The results are reported in Table 2.

From the values of impermeability, and from the corresponding levels of deposited amounts, a "critical value" of the deposited amount, i.e., the minimum deposited amount for an impermeability of more than 24 hours under a water column of 2 meters, was evaluated.

EXAMPLE 7

By the same procedures of Example 6, but starting from the dispersion obtained according to Example 5, 7 samples of coated fabric were prepared and subjected to the same tests, with the results summarized in Table 3.

EXAMPLE 8

By the same procedures of Example 6, but starting from the dispersion obtained according to Example 4, 5 samples of coated fabric were prepared and subjected to the same tests, with the results as summarized in Table 4 being obtained.

EXAMPLE 9

In order to verify their resistance to washing treatments, the samples of Example 6 were treated in a Launder-O-Meter washing machine for 30 minutes at 40° C., with detergent ECE 77 at 5 parts per thousand and with a bath ratio of 1:20. These were then dried in air and subsequently at 80° C. for 10 minutes, and were finally subjected to the impermeability test. The results are summarized in Table 5.

Neither the spray test—because it is less critical than the impermeability test—nor the measurement of the permeability to water vapor—in that it can only improve owing to washing operations—was carried out.

The results demonstrate the small influence of washing on the applicative characteristics of the textile articles thus treated.

EXAMPLE 10

A further set of samples was prepared with a type of nylon analogous to that used in the above examples, but more permeable to water vapor (permeability of 2,600 instead of 2,175 ng/s m$^2$Pa). These samples were prepared by operating according to the same procedures as in Example 8.

The results are reported in Table 6.

TABLE 1

| Characteristics | Unit of Measure | Values |
|---|---|---|
| Chemical composition | — | nylon |
| Weight per surface unit | g/m$^2$ | 65 |
| Warp count | dtex | 67 |
| Warp filaments | — | 17 |
| Warp insertions | cm$^{-1}$ | 48 |
| Weft count | dtex | 78 |
| Weft insertions | cm$^{-1}$ | 33 |
| Weave | — | plain weave |
| Spray test | — | 50 |
| Impermeability (700 mm water column) | mm | 0 |
| Permeability to water vapor | ng/sm$^2$ Pa | 2,175 |

TABLE 2

| Tests | Unit of Measure | Samples 1 | 2 | 3 | 4 | 5 |
|---|---|---|---|---|---|---|
| Deposited amount | g/m$^2$ | 17 | 23 | 35 | 42 | 47 |
| Spray test | — | 90 | 90 | 90 | 90 | 90 |
| Impermeability | | | | | | |
| 700 mm water column | mm | 400 | 700 | 700 | 700 | 700 |
| | miln | — | >10 | >10 | >10 | >10 |
| 2 m water column | hours | 0 | >24 | >24 | >24 | >24 |
| Permeability to water vapor | ng/s m$^2$ Pa | 1096 | 931 | 809 | 792 | 792 |
| Critical deposited amount (c.d.) | g/m$^2$ | | 20 | | | |
| Permeability at c.d. | ng/s m$^2$ Pa | | 1030 | | | |

TABLE 3

| | Unit of Measure | Samples 1 | 2 | 3 | 4 | 5 |
|---|---|---|---|---|---|---|
| Deposited amount | g/m$^2$ | 15 | 23 | 27 | 35 | 43 |
| SPRAY TEST | — | 50 | 50 | 50 | 50 | 50 |
| Impermeability | | | | | | |
| 700 mm water column | mm | 400 | 700 | 700 | 700 | 700 |
| | min | — | 2 | >10 | >10 | >10 |
| 2 m water column | hours | 0 | 0 | 0 | 0 | >24 |
| Permeability to water vapor | ng/s m$^2$ Pa | 1027 | 818 | 905 | 661 | 783 |
| Critical deposited amount (c.d.) | g/m$^2$ | | 40 | | | |
| Permeability at c.d. | ng/s m$^2$ Pa | | 730 | | | |

| | Unit of Measure | Samples 6 | 7 |
|---|---|---|---|
| Deposited amount | g/m$^2$ | 47 | 54 |
| Spray test | — | 50 | 50 |
| Impermeability | | | |
| 700 mm water head | mm | 700 | 700 |
| | min | >10 | >10 |
| 2 m water head | hours | >24 | >24 |
| Permeability to water vapor | ng/s m$^2$ Pa | 705 | 774 |
| Critical deposited amount (c.d.) | g/m$^2$ | | |

TABLE 4

| Tests | Unit of Measure | Samples 1 | 2 | 3 | 4 | 5 |
|---|---|---|---|---|---|---|
| Deposited amount | g/m$^2$ | 17 | 28 | 31 | 38 | 53 |

TABLE 4-continued

| Tests | Unit of Measure | Samples | | | | |
|---|---|---|---|---|---|---|
| | | 1 | 2 | 3 | 4 | 5 |
| Spray test | — | 80 | 80 | 80 | 90 | 90 |
| Impermeability | | | | | | |
| 700 mm water column | mm | 250 | 700 | 700 | 700 | 700 |
| | min | — | >10 | >20 | >10 | >10 |
| 2 m water column | hours | 0 | >24 | >24 | >24 | >24 |
| Permeability to water vapor | ng/s m² Pa | 879 | 914 | 887 | 922 | 757 |
| Critical deposited amount (c.d.) | g/m² | | 20 | | | |
| Permeability at c.d. | ng/s m² Pa | | 910 | | | |

TABLE 5

| Tests | Units of Measure | Samples | | | | |
|---|---|---|---|---|---|---|
| | | 1 | 2 | 3 | 4 | 5 |
| Impermeability after washing 2 m water column | hours | 0 | >24 | >24 | >24 | >24 |

TABLE 6

| Tests | Unit of Measure | Samples | | | | |
|---|---|---|---|---|---|---|
| | | 1 | 2 | 3 | 4 | 5 |
| Deposited amount | g/m² | 12 | 27 | 36 | 45 | 54 |
| Spray test | — | 80 | 80/90 | 80/90 | 80/90 | 80/90 |
| Impermeability | | | | | | |
| 70 mm water column | mm | 150 | 700 | 700 | 700 | 700 |
| | min | — | >10 | >10 | >10 | >10 |
| 2 m water column | hours | 0 | >24 | >24 | >24 | >24 |
| Permeability to water vapor | ng/s m² Pa | 1024 | 1027 | 1001 | 948 | 879 |
| Critical deposited amount (d.c.) | g/m² | | 20 | | | |
| Permeability at d.c. | ng/s m² Pa | | 1130 | | | |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Stable aqueous dispersions of fluorinated polyurethanes containing in their macromolecules hydrophilic ionic groups, both of anionic and cationic character, obtained by the process comprising the steps:

(a) preparing a fluorinated polyisocyanate, by reaction between an organic diisocyanate and a mixture comprising diols containing ionizable groups and macroglycols comprising polyols and at least 1% by weight of one or more hydroxy- and/or carboxy-capped fluoropolyoxyalkylene ethers;
    (b) salifying the so-obtained fluorinated polyisocyanate, to convert the ionizable groups into hydrophilic cations or anions; and
    (c) dispersing and chain extending the salified fluorinated polyisocyanate in water.

2. Aqueous dispersions according to claim 1, wherein the molar ratio between the isocyanate groups to the sum of the hydroxyl groups is within the range of from 1.2 to 2.

3. Aqueous dispersions according to claim 2, wherein the molar ratio between the isocyanate groups to the sum of the hydroxyl groups is 1.5.

4. Aqueous dispersions according to claim 1, 2 or 3, wherein the macroglycols comprise from 3 to 15% by weight of one or more hydroxy- and/or carboxy-capped fluoropolyoxyalkylene ethers.

5. Aqueous dispersions according to claim 1, 2 or 3, wherein the hydroxy- and/or carboxy-capped fluoropolyoxyalkylene ethers have a molecular weight within the range of from 500 to 7000, preferably of from 1000 to 2500.

6. Aqueous dispersions according to claim 1, 2 or 3, wherein the hydroxy- and/or carboxy-capped fluoropolyoxyalkene ethers are selected from the class consisting of those having the formulae:

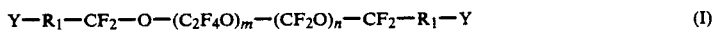

$$Y-R_1-CF_2-O-(C_2F_4O)_m-(CF_2O)_n-CF_2-R_1-Y \quad (I)$$

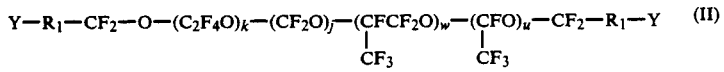

$$Y-R_1-CF_2-O-(C_2F_4O)_k-(CF_2O)_j-(CFCF_2O)_w-(CFO)_u-CF_2-R_1-Y \quad (II)$$
$$\qquad\qquad\qquad\qquad\qquad\qquad\quad | \qquad\qquad | $$
$$\qquad\qquad\qquad\qquad\qquad\qquad\quad CF_3 \qquad\quad CF_3$$

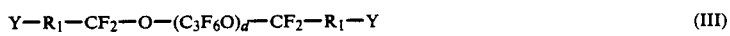

$$Y-R_1-CF_2-O-(C_3F_6O)_d-CF_2-R_1-Y \quad (III)$$

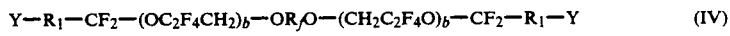

$$Y-R_1-CF_2-(OC_2F_4CH_2)_b-OR_fO-(CH_2C_2F_4O)_b-CF_2-R_1-Y \quad (IV)$$

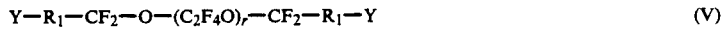

$$Y-R_1-CF_2-O-(C_2F_4O)_r-CF_2-R_1-Y \quad (V)$$

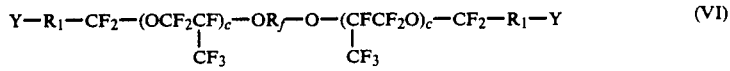

$$Y-R_1-CF_2-(OCF_2CF)_c-OR_f-O-(CFCF_2O)_c-CF_2-R_1-Y \quad (VI)$$
$$\qquad\qquad\qquad\qquad\quad | \qquad\qquad\qquad | $$
$$\qquad\qquad\qquad\qquad\quad CF_3 \qquad\qquad\quad CF_3$$

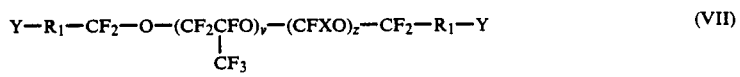

$$Y-R_1-CF_2-O-(CF_2CFO)_y-(CFXO)_z-CF_2-R_1-Y \quad (VII)$$
$$\qquad\qquad\qquad\qquad\qquad | $$
$$\qquad\qquad\qquad\qquad\qquad CF_3$$

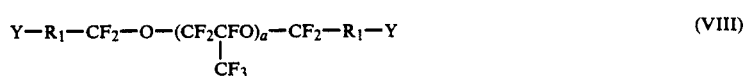

$$Y-R_1-CF_2-O-(CF_2CFO)_a-CF_2-R_1-Y \quad (VIII)$$
$$\qquad\qquad\qquad\qquad\qquad | $$
$$\qquad\qquad\qquad\qquad\qquad CF_3$$

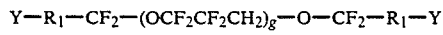
 (IX)

wherein:
- $R_1$ is selected from $-(CH_2)_x-$, $-(CH_2O)_yCH_2-$, $-(CH_2)_xOCH_2-$, wherein x and y are integers within the range of from 1 to 4;
- m and n are integers, wherein the m/n ratio is within the range of from 0.2 to 2, preferably within the range of from 0.5 to 1.2;
- $R_f$ is a perfluoroalkylene radical;
- X is $-F$ or $-CF_3$;
- Y represents an $-OH$ and/or a $-COOH$ group; and
- k, j, w, u, d, b, r, c, v, z, a, g are integers which make it possible for the above-mentioned molecular weights to be obtained.

7. Aqueous dispersions according to claim 6, wherein the hydroxy- and/or carboxy-capped fluoropolyoxyalkylene ethers are α, ω-bis-(hydroxymethyl)-polyoxyperfluoroalkylene and α, ω-(polyoxyperfluoroalkane)-dioic acid, with an average molecular weight of 2,000.

8. Stable aqueous dispersions of fluorinated polyurethanes containing in their macromolecule hydrophilic ionic groups, of either anionic or cationic nature, obtained by the process comprising the following steps:
   (i) preparing a fluorinated polyisocyanate prepolymer by reacting an organic diisocyanate with a mixture comprising diols containing ionizable groups and macroglycols comprising polyols and at least 1% by weight one or more hydroxy- and/or carboxy-capped fluoropolyoxyalkylene ethers;
   (ii) converting of the fluorinated polyisocyanic prepolymer into an oligo-urethane having unsaturated vinyl end groups, by reacting a compound containing hydroxyl reactive with the isocyanate groups selected from the class consisting of hydroxy-alkyl-acrylates or -methacrylates having the formula:

 (X)

wherein $R_2$ is hydrogen or a $(C_1-C_4)$-alkyl radical and W is a hydroxyalkyl radical;
   (iii) salifying of the so-obtained oligo-urethane to convert the ionizable groups into hydrophilic cations or anions;
   (iv) dispersing the salified oligo-urethane in water; and
   (v) polymerizing the unsaturated end groups of said oligo-urethane dispersed in water.

9. Aqueous dispersions according to claim 8, wherein the hydroxyalkyl-acrylates or -methacrylates are those wherein R is hydrogen or a methyl radical, and W is a 2-hydroxyethyl-, 2-hydroxypropyl-, 3-hydroxypropyl- or 4-hydroxybutyl-radical.

10. Aqueous dispersions according to claim 8, wherein the hydroxyalkyl-acrylates or -methacrylates are used in such a an amount as to have NCO-eq/OH-eq ratios, to the free isocyanate groups present in the polyisocyanic prepolymer, within the range of from 0.5 to 1.1, preferably equal to 1.

11. Aqueous dispersions according to claim 9, wherein the hydroxyalkyl-acrylates or -methacrylates are used in such an amount as to have NCO-eq/OH-eq ratios, to the free isocyanate groups present in the polyisocyanic prepolymer, within the range of from 0.5 to 1.1, preferably equal to 1.

12. Aqueous dispersions according to claim 1, 2 or 3, wherein the salified fluorinated polyisocyanate dispersed in water having a content of solids higher than 20% by weight, preferably within the range of from 30 to 50% by weight.

13. Aqueous dispersions according to claim 1, 2 or 3, wherein the fluorinated polyurethanes contain in their macromolecule ionic groups in an amount within the range of from 10 to 60 milliequivalents per 100 g of polymer, preferably of from 20 to 40 meq/100 g of polymer.

* * * * *

UNITED STATES PATENT AND TRADEMARK OFFICE
CERTIFICATE OF CORRECTION

PATENT NO. : 4,983,666

DATED : January 8, 1991

INVENTOR(S) : ZAVATTERI, et al.

It is certified that error appears in the above-identified patent and that said Letters Patent is hereby corrected as shown below:

ON TITLE PAGE:

Line [21]

Change Application No. "467,324" to --467,342--.

Signed and Sealed this

Seventh Day of July, 1992

Attest:

DOUGLAS B. COMER

*Attesting Officer*  *Acting Commissioner of Patents and Trademarks*